(12) United States Patent
Bouysset et al.

(10) Patent No.: US 8,316,659 B2
(45) Date of Patent: Nov. 27, 2012

(54) THERMAL ENERGY MANAGEMENT DEVICE FOR A VEHICLE

(75) Inventors: Jean-Louis Bouysset, Bazainville (FR); Martial Cozic, Breux sur Avre (FR); Dominique Hoslin, Guyancourt (FR)

(73) Assignee: Nexter Systems, Roanne (FR)

( * ) Notice: Subject to any disclaimer, the term of this patent is extended or adjusted under 35 U.S.C. 154(b) by 354 days.

(21) Appl. No.: 11/442,301

(22) Filed: May 30, 2006

(65) Prior Publication Data
US 2010/0243751 A1    Sep. 30, 2010

(30) Foreign Application Priority Data

May 30, 2005 (FR) ...................................... 05 05531

(51) Int. Cl.
F25B 27/00 (2006.01)
F25B 15/00 (2006.01)
F25B 35/00 (2006.01)

(52) U.S. Cl. ........................... 62/238.3; 62/497; 62/476

(58) Field of Classification Search ................. 62/238.3, 62/497, 476
See application file for complete search history.

(56) References Cited

U.S. PATENT DOCUMENTS

| | | | | |
|---|---|---|---|---|
| 2,027,610 | A * | 1/1936 | Nesselmann et al. | 62/238.3 |
| 2,088,276 | A * | 7/1937 | Nesselmann et al. | 62/335 |
| 2,783,622 | A * | 3/1957 | Bourassa | 62/238.3 |
| 2,979,923 | A * | 4/1961 | Bury | 62/476 |
| 3,393,100 | A * | 7/1968 | Niedrach | 429/17 |
| 3,535,888 | A * | 10/1970 | Eannarino et al. | 62/148 |
| 3,625,279 | A * | 12/1971 | Mayo | 165/62 |
| 4,093,514 | A * | 6/1978 | Iljunin et al. | 376/207 |
| 4,168,030 | A * | 9/1979 | Timmerman | 237/13 |
| 4,234,782 | A * | 11/1980 | Barabas et al. | 392/345 |
| 4,258,677 | A * | 3/1981 | Sanders | 123/142.5 R |
| 4,307,575 | A * | 12/1981 | Popinski et al. | 62/148 |
| 4,408,468 | A * | 10/1983 | Alefeld et al. | 62/476 |
| 4,479,364 | A * | 10/1984 | Maier-Laxhuber | 62/141 |
| 4,798,242 | A * | 1/1989 | Kito et al. | 165/103 |
| 5,291,960 | A * | 3/1994 | Brandenburg et al. | 180/65.27 |
| 5,345,786 | A * | 9/1994 | Yoda et al. | 62/476 |
| 5,896,747 | A * | 4/1999 | Antohi | 62/101 |
| 5,950,752 | A * | 9/1999 | Lyons | 180/65.22 |
| 7,348,741 | B2 * | 3/2008 | Minekawa et al. | 318/268 |

(Continued)

FOREIGN PATENT DOCUMENTS

DE    27 56 348 A1    6/1979

(Continued)

OTHER PUBLICATIONS

Oxford English Dictionary, Online Edition definition of "heat" retrieved Jun. 3, 2010.*

(Continued)

Primary Examiner — Ljiljana Ciric
Assistant Examiner — Alexis Cox
(74) Attorney, Agent, or Firm — Steptoe & Johnson LLP

(57) ABSTRACT

The invention relates to a thermal energy management device for a vehicle, namely a vehicle equipped with an electric generator associating and fuel cell and hydrogen reformer, comprising at least one primary circuit circulating a first heat-conducting fluid, such circuit enabling calories to be collected from a thermal source and transported to at least one thermal exchanger wherein said device comprises at least one thermal exchanger constituted by a sorption exchanger, enabling the thermal energy management of vehicles, and namely, armored vehicles.

15 Claims, 3 Drawing Sheets

U.S. PATENT DOCUMENTS

| | | | |
|---|---|---|---|
| 7,673,475 B2 * | 3/2010 | Bruzzo | 62/476 |
| 2002/0112494 A1 * | 8/2002 | Harth | 62/239 |
| 2003/0051496 A1 * | 3/2003 | Fukushima et al. | 62/238.3 |
| 2003/0167925 A1 * | 9/2003 | Aikawa et al. | 96/126 |
| 2004/0009382 A1 * | 1/2004 | Fly | 429/26 |
| 2004/0086759 A1 * | 5/2004 | Parchamazad | 429/26 |
| 2005/0138941 A1 * | 6/2005 | Kikuchi | 62/178 |
| 2006/0053814 A1 * | 3/2006 | Naik et al. | 62/241 |
| 2007/0033951 A1 * | 2/2007 | Goenka et al. | 62/3.7 |

FOREIGN PATENT DOCUMENTS

| | | |
|---|---|---|
| EP | 1 500 802 A1 | 7/2004 |
| FR | 2 832 786 | 5/2003 |

OTHER PUBLICATIONS

Oxford English Dictionary, Online Edition definition of "thermal" retrieved Jun. 3, 2010.*

* cited by examiner

THERMAL ENERGY MANAGEMENT DEVICE FOR A VEHICLE

BACKGROUND OF THE INVENTION

1. Field of Invention

The technical scope of the invention is that of devices to manage the thermal energy on a vehicle and more particularly on a vehicle incorporating an electric generator associating a fuel cell and a hydrogen reformer.

2. Description of the Related Art

Fuel cells convert the chemical energy of an oxido-reducing reaction implementing hydrogen into electrical energy. These fuel cells are increasingly important in vehicles both as an auxiliary power chamber and as main energy generating means.

In fact, they enable the carbon dioxide gaseous emissions from the vehicle to be strongly reduced. The cells practically release only water vapor which can be recovered.

Fuel cells are well known to the Expert. Proton exchange membrane fuel cells (PEMFC) are known whose main characteristic is that of being able to function at low temperatures (of around 80° C.).

These may be associated with a hydrogen reformer which enables hydrogen to be generated by using water and a fuel such as petrol, diesel oil, methanol, natural gas, diester or other hydrocarbon.

The reformer operates at a generally high temperature (from 800° C. to 1000° C.) whereas the membrane fuel cell functions optimally at a temperature of around 80° C.

The use of thermal energy generated by a fuel cell has been proposed to warm the interior of the vehicle or else to air condition it by coupling the cell with a conventional cooling circuit implementing a compressor.

Patent FR-2805926 thus proposes a thermal management device for a vehicle in which a primary circuit of heat conducting fluid ensures the temperature regulations of the fuel cell. This primary circuit is in a thermal exchange relation with a secondary cooling circuit.

The drawbacks to known devices lie in that the thermal energy available from the fuel cell is not enough to ensure most of the necessary thermal functions in a vehicle. Moreover, it is necessary for the cooling circuit temperature of the fuel cell to be regulated at around 80° C. thereby limiting the possibility of employing thermal energy in the exchange circuits.

The cooling circuit thus incorporates a compressor, and if this enables the primary circuit temperature to be partly reduced, it is essentially electrical energy which is supplied to the compressor enabling the desired cooling level to be obtained. This results in additional stressing of the fuel cell.

Furthermore, cooling compressors are noisy appliances whose implementation in a vehicle may cause problems, namely when the vehicle is a military vehicle which must stay in a surveillance position whilst remaining as stealthy as possible, both from an acoustic and thermal perspective.

SUMMARY OF THE INVENTION

The aim of the invention is to propose a thermal energy management device for a vehicle which can overcome such drawbacks.

Thus, the device according to the invention enables the use of thermal energy to be optimized, and in particular that generated by the generator, whilst ensuring full acoustic discretion. It also enables thermal masking functions to be ensured, when implemented in a military vehicle.

Thus, the invention relates to a thermal energy management device for a vehicle, namely a vehicle equipped with an electric generator associating a fuel cell and hydrogen reformer, such device comprising at least one primary circuit circulating a first heat-conducting fluid, such circuit enabling calories to be collected from a thermal source and transported to at least one thermal exchanger, such device wherein it comprises at least one thermal exchanger constituted by a sorption exchanger.

The primary circuit may collect calories from a vehicle exhaust.

The primary circuit may collect calories from a reformer.

The primary circuit may, in particular, collect calories by convection or by direct contact with a hot part of the reformer and/or exhaust.

According to another characteristic, the thermal energy management device may comprise at least one thermal convection exchanger ensuring the heating of an organ of the vehicle.

It may namely incorporate a thermal convection exchanger which enables calories to be exchanged with the engine cooling circuit of the vehicle.

According to one embodiment, the primary circuit may comprise a closed loop to which at least two side outlets, positioned in series and each forming the heat source for a separate exchanger, will be linked, each side outlet being shunted by a branch of the primary circuit equipped with a valve.

Each sorption exchanger may thus incorporate a secondary circuit of heat-conducting fluid isolated from the primary circuit and using a side outlet from the primary circuit as a heat source.

According to another embodiment, at least one sorption exchanger may use the first heat-conducting fluid collected from the primary circuit by a side outlet, the latter being shunted by a branch of the primary circuit equipped with a valve.

The thermal energy management device may incorporate a control unit ensuring the temperature piloting of the different thermal exchange circuits according to instructions given by an operator or memorized.

According to different variants: the device may incorporate a sorption exchanger enabling the cooling of electronic circuits and/or a sorption exchanger enabling the cooling of at least one electrical energy storage battery and/or a sorption exchanger enabling the cooling of an air conditioning chamber of the vehicle.

Advantageously, the device may incorporate a sorption exchanger which enables the cooling of at least one thermal insulation chamber positioned at a hot part of the vehicle.

BRIEF DESCRIPTION OF THE DRAWINGS

The invention will be better understood from the additional description given hereafter of the different embodiments, such description being made with reference to the appended drawings, in which.

DETAILED DESCRIPTION OF PREFERRED EMBODIMENTS

Figure 1:
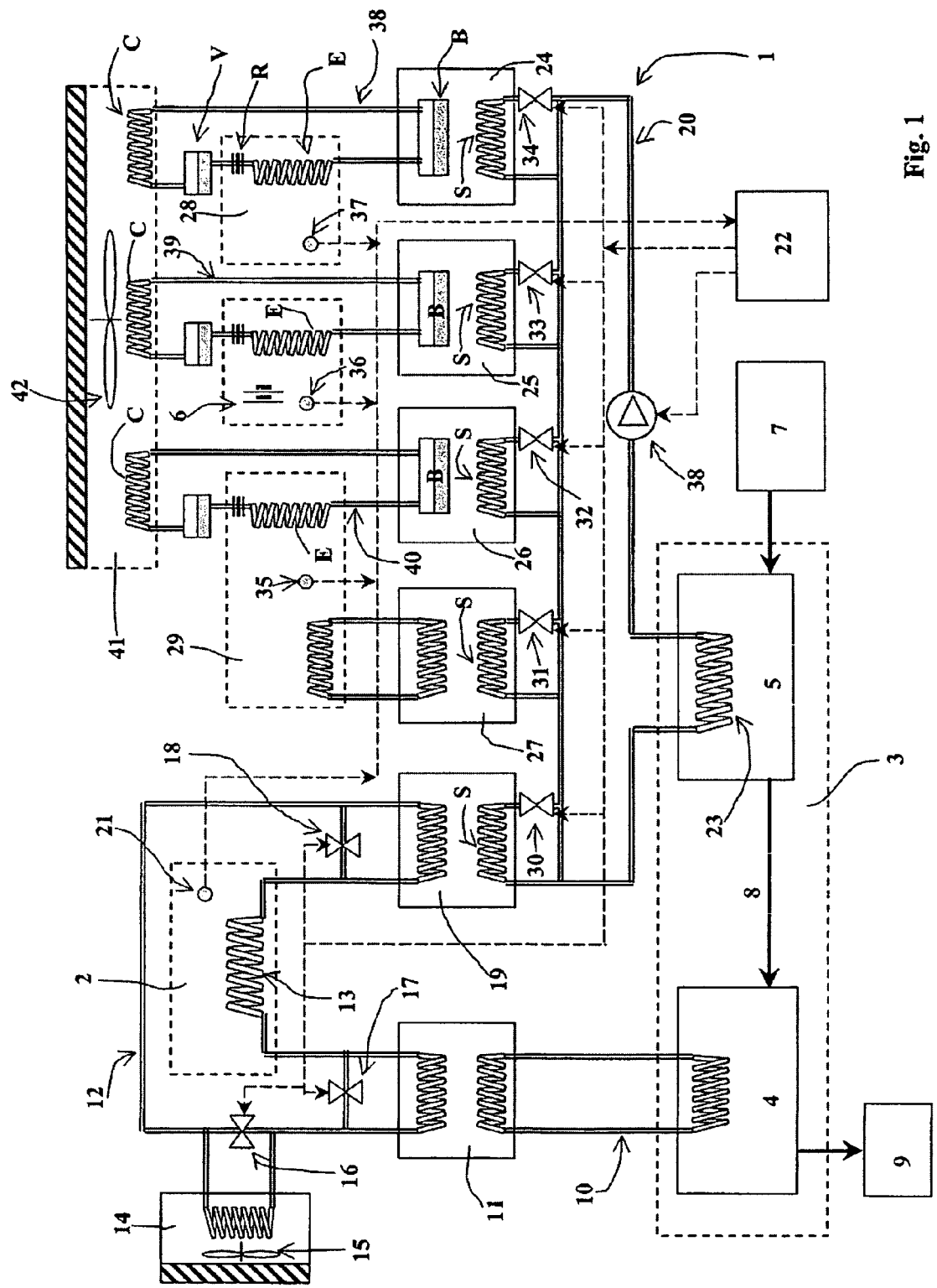
FIG. 1 is a schematic representation of a thermal energy management device according to a first embodiment of the invention.

With reference to FIG. 1, a thermal energy management device 1 according to the invention has been installed onto a vehicle, not shown, for example an armored vehicle.

The vehicle here is a conventional thermal propulsion vehicle comprising an engine 2. This vehicle comprises an auxiliary power chamber formed by an electric generator 3 associating a fuel cell 4 and hydrogen reformer 5.

The vehicle's electrical network (not shown) also comprises storage batteries 6 enabling the spikes (voltage) to be smoothed on the electrical network when a generator 3 is used.

The electric generator is not described in detail since it does not constitute the subject of the present invention. It classically comprises conversion means integrated into the reformer 5 and which enable hydrogen to be generated from water and a conventional fuel stored in a tank 7. The reformer 5 thus supplies the fuel cell 4 with hydrogen (piping 8).

The water produced by the fuel cell 4 may be stored in a tank 9 to be able to be used by the vehicle crew. Part of this water may, furthermore, be integrated into a cooling circuit 10 for the fuel cell. Such water recycling is known and is described in application FR-2805926.

Classically, the cooling circuit 10 incorporates a thermal exchanger 11 enabling the fuel cell 4 to be cooled by means of the main cooling circuit 12 of the thermal engine 2. This last circuit comprises an insert 13 positioned at the engine and linked to a radiator 14 which may be equipped with a ventilator 15 enabling thermal exchange with the ambient air of the vehicle.

Valves 16, 17 and 18 are positioned in the circuit 12 and enable to respectively shunt: the radiator 14, exchanger and a second exchanger 19 associated with a primary circuit 20 which will be described later.

Valves 16, 17 and 18 thereby enable regulation of the thermal exchanges between the cooling circuit 12 of the engine and the heat sources constituted by the cooling circuit 10 of the fuel cell and the primary circuit 20.

Thermal regulation will be ensured by an electronic control unit 22 according to the actual temperature of the engine 2 measured by a temperature sensor 21.

In accordance with the invention, the device 1 thus also incorporates a primary circulation circuit 20 for a first heat-conducting fluid. This circuit (as for circuit 10) enables calories to be collected from a thermal source which here is the reformer 5. Collection will be made by convection or by direct contact with a part of the reformer. These collection means are schematized in the Figures by a coil 23.

The primary circuit 20 enables the calories supplied by the reformer 5 to be transported towards at least one thermal exchanger: 19, 24, 25, 26, 27.

According to an essential characteristic of the invention, at least one of the thermal exchangers is constituted by a sorption exchanger (that is to say, using the absorption or adsorption technique).

Absorption exchangers are known, namely in the field of portable refrigeration. They implement a heat-conducting fluid which is, more often than not, a mixture of ammoniac and water. The fluid is evaporated by a boiler B, it passes into an air-cooled condenser C, the liquid is then recovered in a drain pan V connected to an evaporator E by means of a restriction R. The evaporator E output is linked to the boiler B.

The system is reliable and functions continuously. Heat merely has to be supplied (either continuously or intermittently) to the boiler B. With a fluid associating ammoniac and water, the desired temperature is of around 80° C. to 100° C. Known absorption refrigerators use a burner, for example gas, to vaporize the fluid, or else use electric heating.

Adsorption exchangers are also known to somebody skilled in the art. These exchangers differ from absorption exchangers in that the heat-conducting fluid implemented circulates at the surface of an exchange material and not in its volume.

In accordance with the invention, the heat collected from a reformer 5 will be used to heat the fluid in three cooling exchangers (here, absorption exchangers) 24, 25 and 26.

Each absorption exchanger here incorporates a secondary circuit 38, 39, 40 for a second heat-conducting fluid. Each secondary circuit is completely insulated from the primary circuit 20 and comprises: boiler, condenser, drain pan, restriction and evaporator.

Each secondary circuit uses a side outlet of the primary circuit as a heat source. Condensers C of the different cooling circuits 38, 39, 40 may be assembled in a single radiator 41 incorporating a ventilator 42. It is naturally also possible to provide several radiators, depending on the vehicle's integration constraints, for example one for each condenser C. Radiator 41 and radiator 14 associated with the engine may advantageously be combined into a single radiator.

The exchanger 24 enables, for example, the cooling of an electronic compartment 28. Exchanger 25 enables the vehicle's batteries 6 to be cooled and exchanger 26 enables an air conditioning assembly 29 for the interior of the vehicle to be supplied with frigories.

Moreover, exchanger 27 is a classical convection exchanger supplying the air conditioner 29 with calories.

Lastly, exchanger 19 is also a thermal convection exchanger. It enables the exchange of calories between the primary circuit 20 and the cooling circuit 12 of the vehicle's engine 2, which is a thermal source.

According to this first embodiment of the invention, the primary circuit 20 is a closed loop onto which the different exchangers are linked in the form of several side outlets positioned in series one behind the other.

Each side outlet (schematized by a coil S) thus forms the heat source for a separate exchanger. Each side outlet is moreover shunted by a branch of the primary circuit 20 which is equipped with a valve 30, 31, 32, 33, and 34. The different valves enable the regulation of the flow of fluid from the primary circuit which circulates in the exchanger in question.

The thermal energy affected to each element may thus be distributed according to operational requirements.

The different valves are linked to an electronic control unit 22 which ensures the temperature piloting of the different thermal exchange circuits depending on the instructions given by an operator (or memorized). The control unit is furthermore linked to the temperature sensors 35, 36, and 37 which are associated with the different heated or cooled cavities, 28, 29, for example.

Note that if the complete opening of one of valves 30, 31, 32, 33, or 34 is not enough to fully shunt the coil S of the exchanger in question, it is possible for this valve to be replaced by an on-off valve (not shown) which will be positioned on the branch upstream of the coil S in question. This valve will enable the side outlet to be cut off thereby preventing the fluid from circulating from the primary circuit into the coil S in question.

The primary circuit 20 lastly incorporates a pump 38 enabling the flow of heat-conducting fluid to be regulated according to requirements. This pump is also connected to the control unit 22.

In this particular embodiment, each sorption exchanger 24, 25 and 26 incorporates a secondary circuit isolated from the primary circuit. It is possible for the operating temperature of this circuit to be adjusted independently without prejudicing the performances of the other exchangers. It is thus possible for valves 32, 33 and 34 to be activated only intermittently so as to ensure the boiling of the heat-conducting fluids of the different circuits 38, 39, and 40. It is also possible for one of these circuits to be fully isolated from the primary circuit 20 if it is no longer necessary. Lastly, valve 30 may be closed in order to activate exchanger 19 thereby evacuating an excess of heat towards the engine's cooling circuit 12.

Note that the exchanger 19 can also ensure the preheating of the engine in case of need. In this case, it is unnecessary to implement other means of cold starting the engine. The pump 55, in all events, enables the performances of the exchangers to be improved by adapting the flow of fluid to the required performances and to the fluid temperature in the primary circuit 20.

The efficiency of the device proposed is linked to the high temperature of the thermal source constituted by the reformer 5 (from 800° C. to 1,000° C.) which thus ensures the reliable and stable supply of thermal power required for most of the vehicle's needs.

Note that the reformer's temperature does not have to be fixed strictly at a given level for the reformer to function optimally. There is thus great flexibility in the use which may be made of this energy and it is possible to easily add or remove chambers using the thermal energy from the primary circuit 20.

This is not the case with the fuel cell 4 itself, whose temperature is well below (around 80° C.), and which must be stabilized for optimal production of electricity. Known devices thus use relatively little thermal energy produced by the fuel cell and rather control the cell's temperature.

Another advantage of the invention lies in that the sorption exchangers are completely silent. This characteristic is important for the comfort of the vehicle's occupants and is also essential to guarantee the acoustic discretion of an armored vehicle.

Note also that in classical vehicles, the air conditioning implements one or several refrigerating compressors which consume electrical energy. Thanks to the invention, it is possible for these compressors to be eliminated thereby reducing electrical consumption. When the compressor(s) are driven by the thermal engine, it is moreover necessary for this to be started up, which is noisy. The invention thus enables the acoustic discretion of the vehicle to be improved.

It is naturally possible for other thermal exchangers to be provided. For example, convection exchangers may be provided to ensure heating of another element (for example, to warm up the batteries in case of very cold starting). Other absorption exchangers may also be provided spaced around the different electronic organs of the vehicle requiring cooling.

It is also possible to implement the invention by coupling the primary circuit 20 with a thermal source other than the reformer 5.

The coil 23 may thus be placed in contact with or near to an exhaust (not shown) of the thermal engine 2. This variant is not shown in the Figures but the thermal circuit would be practically identically and would only differ by the location of the coil 23.

The temperatures of the exhausts are relatively high (potentially 500 to 600° C. at the place where the exchanger would be positioned, such value to be adjusted according to the vehicle's architecture) and the thermal energy which is available is thus substantial.

One of the advantages of this embodiment lies in that the collection of thermal energy at the exhaust enables said exhaust to be cooled thereby increasing the vehicle's acoustic discretion.

According to a particularly interesting embodiment, a sorption exchanger may be implemented to ensure the cooling of one or several thermal insulation chambers.

Figure 2:
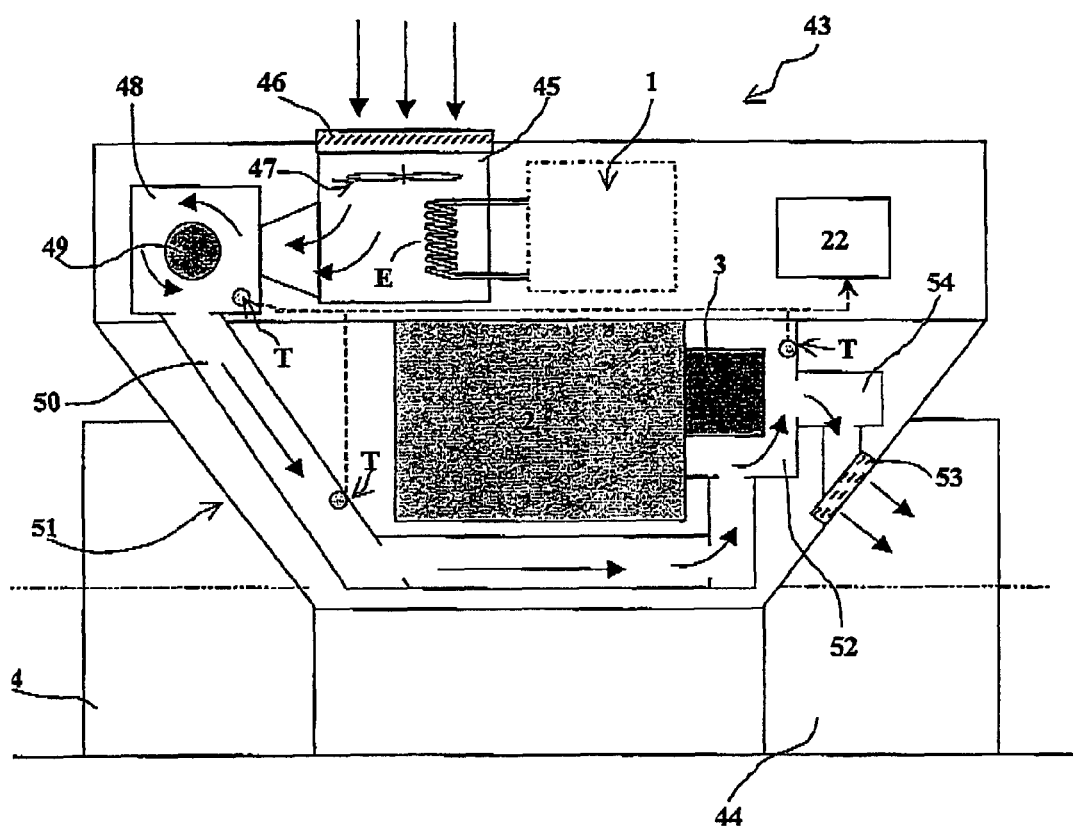
FIG. 2 is a schematic cross section of a wheeled armored vehicle showing an embodiment of the thermal insulation chambers associated with the device according to the invention.

FIG. 2 thus schematically shows a section of a rear part of a wheeled 44 vehicle 43 on which a thermal engine is represented 2 as well as an electric generator 3 associating both fuel cell and reformer.

The thermal energy management device 1 comprises an exchanger which is connected to the primary circuit 20. This exchanger is a sorption exchanger of which only the evaporator E is shown here. This evaporator is positioned in a chamber 45 which communicates outside the vehicle via a grid 46 enabling air to enter. A ventilator 47 arranged in the chamber enables the incoming air flow to be regulated.

Chamber 45 is here linked to another chamber 48 which surrounds an exhaust pipe 49 of the thermal engine 1.

Chamber 48 communicates with a third chamber 50 which extends along one wall 51 of the vehicle 43 before opening out into a fourth chamber 52 surrounding the electric generator 3. The air is expelled outside through a grid 53 which is connected to chamber 52 by a pipe 54.

Thus, the air taken in from outside is cooled thanks to the evaporator E then sent into the different chambers which ensure the thermal insulation of different hot parts of the vehicle (engine 2, exhaust 49, electric generator 3).

Each chamber will be advantageously equipped with a temperature sensor T linked to the control unit 22 which regulates the device. Comparing the temperatures measured by the sensors T and the set values programmed into the control unit 22 will cause (using an appropriate piloting algorithm) the start up or acceleration of the ventilator 47 and the modification of the set temperature given to the sorption exchanger associated with the evaporator E arranged in the chamber 45.

It is thus possible for the thermal signature of the vehicle to be fully controlled according to the actual temperatures of the different hot parts.

FIG. 2 is naturally only a simplified schema to aid in the description of the invention. According to the construction data of the vehicle and the different hot parts, it is possible to provide several sorption exchangers to regulate the separate thermally insulating chambers.

Different evaporators (coupled with different exchangers) may thus be provided for chamber 48, chamber 50 and chamber 52.

Such a solution would enable the temperatures to be even better controlled. Indeed, the temperatures of the hot parts may be very different from one chamber to another. It is therefore advisable to pilot the temperatures of each chamber individually.

It will, however, be possible for all the chambers to be associated with a single external air intake and a single air evacuation. For this, suitable piping will be provided to take the air flow in parallel from the outside to each chamber and from each chamber to the outside.

Figure 3:
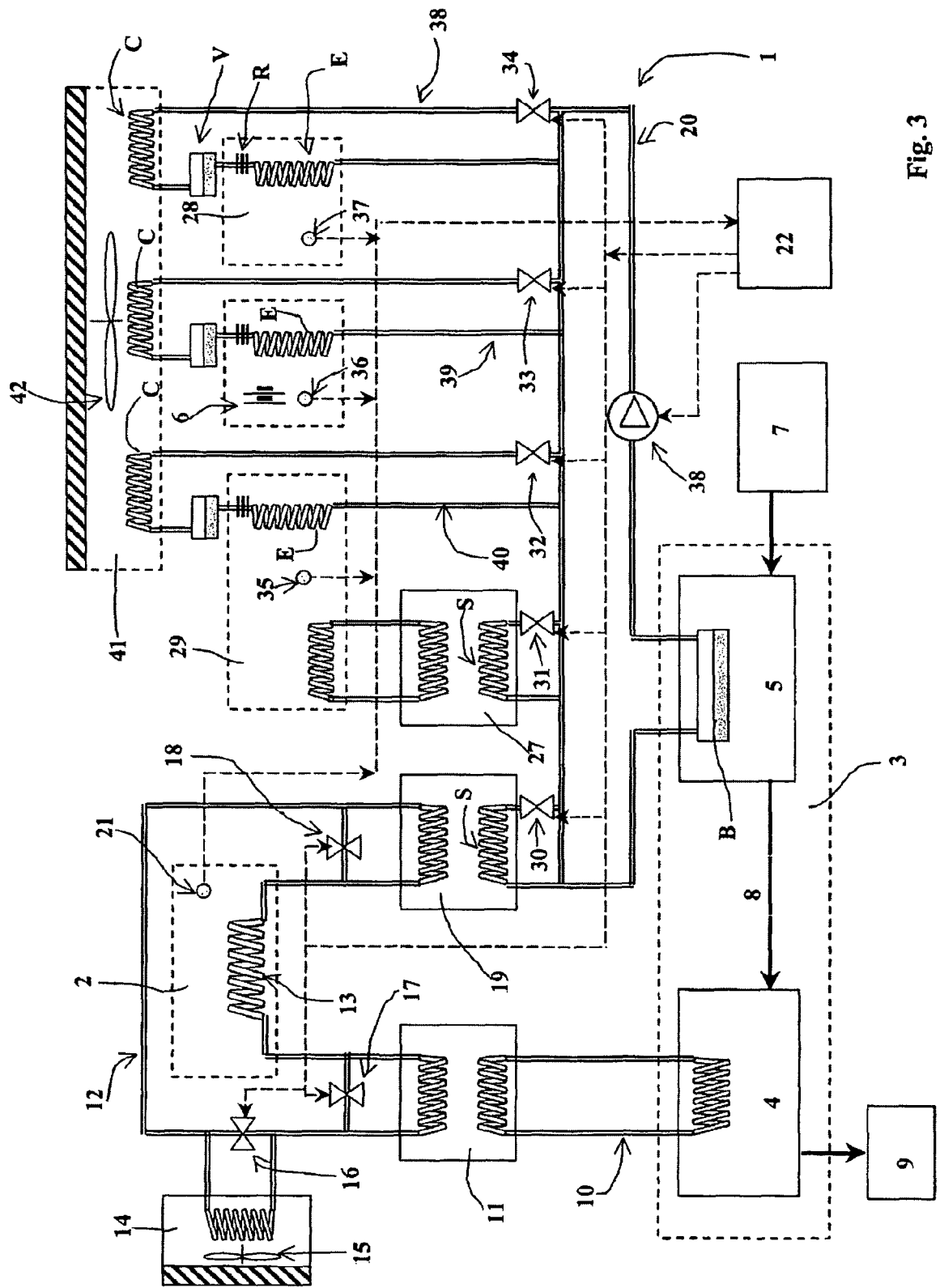
FIG. 3 is a schematic representation of a thermal energy management device according to a second embodiment of the invention.

FIG. 3 shows a thermal energy management device 1 according to a second embodiment of the invention.

The elements constituting this device that are analogous to those described previously are referenced using the same numbers. It is unnecessary for them to be described again in detail.

This embodiment differs from that shown in FIG. 1 in that the primary circuit 20 is no longer insulated from the secondary circuits 38, 39 and 40 of the different sorption exchangers.

Thus, a single suitably dimensioned boiler B is positioned in contact with the reformer 5 and conducts the first heat-conducting fluid (which associates, for example, ammoniac and water) to the different condensers C via the side outlets located in the primary circuit 20.

As in the previous embodiment, each outlet is shunted by a branch of the primary circuit which is equipped with a valve 32, 33, and 34. As in the previous embodiment, it is naturally possible for each valve 32, 33, 34 to be replaced by an on/off valve (not shown) which will be positioned on the branch upstream of the exchanger in question. This valve will enable the side outlet to be shut and will prevent fluid from passing from the primary circuit into the sorption exchanger in question.

The control unit 22, once again, enables the heat-conducting fluid flow given in each sorption exchanger to be piloted, and thus also enables the implementation of the stoppage of each ab (or ad-)sorber as well as the regulation of the temperature.

As in the previous embodiment, the primary circuit comprises convection exchangers 19 and 27 which collect the heat from the primary fluid.

The above description has been made with reference to sorption exchangers that associate a mixture of ammoniac and water. It is naturally possible (according to the thermal exchange needs encountered) to use other pairs of heat-conducting fluids, such as: water/lithium bromide; ammoniac/lithium nitrate; methylamine/water; methanol/lithium bromide.

It is also possible for the invention to be implemented using adsorption exchangers.

What is claimed is:

1. A thermal energy management device for a vehicle equipped with an electric generator associating a fuel cell and hydrogen reformer, said device comprising:
   a thermal source (2),
   at least one primary circuit (20) for circulating a first heat-conducting fluid,
   a plurality (24-27) of thermal exchangers, said primary circuit enabling heat to be collected from said thermal source (2) and transported to at least one of said thermal exchangers (24-27),
   wherein said at least one thermal exchanger is a sorption exchanger,
   a plurality of chamber cavities each of which cavities is associated with but separate from one of said plurality of thermal exchangers,
   said primary circuit comprises a closed loop having a plurality of side outlets, said side outlets being positioned in series within the loop,
   each of said plurality of thermal exchangers connected to one of said side outlets for supplying heat conducting fluid to the cavity associated with that thermal exchanger for thereby heating that thermal exchanger,
   each side outlet having a valve capable of directing said first heat-conducting fluid through the outlet and capable of causing all of said first heat-conducting fluid to completely bypass the outlet.

2. A thermal energy management device according to claim 1, wherein said thermal source is a vehicle exhaust system.

3. A thermal energy management device according to claim 2, wherein said primary circuit is for mounting contiguous to a hot part of a vehicle exhaust system, for collecting heat therefrom.

4. A thermal energy management device according to claim 1, wherein said thermal source is the hydrogen reformer.

5. A thermal energy management device according to claim 4, wherein said primary circuit is for mounting contiguous to a hot part of said hydrogen reformer, for collecting heat therefrom.

6. A thermal energy management device according to claim 1, wherein at least one of said thermal exchangers is a thermal convection exchanger for mounting contiguous to an organ of said vehicle, for heating said organ.

7. A thermal energy management device according to claim 6, wherein said thermal convection exchanger enables heat to be exchanged with the cooling circuit of an engine of said vehicle.

8. A thermal energy management device according to claim 1, further comprising at least one secondary circuit for circulating a second heat-conducting fluid isolated from said primary circuit,
   wherein said sorption exchanger is connected to said primary circuit and said secondary circuit, and gains heat from said side outlets of said primary circuit.

9. A thermal energy management device according to claim 1, wherein said one at least sorption exchanger uses said first heat-conducting fluid collected from said primary circuit by a side outlet.

10. A thermal energy management device according to claim 1, further comprising a control unit for managing the temperature of said at least one thermal exchange circuit.

11. A thermal energy management device according to claim 1, wherein said sorption exchanger is connected to an electronic circuit, wherein the sorption exchanger is for cooling an electronic circuit.

12. A thermal energy management device according to claim 1, wherein said sorption exchanger is connected to a thermal insulation chamber arranged around a hot part of said vehicle, and the sorption exchanger is for cooling the thermal insulation chamber.

13. A thermal energy management device according to claim 1, wherein said sorption exchanger is connected to at least one electrical energy storage battery, and the sorption exchanger is for cooling the at least one electrical energy storage battery.

14. A thermal energy management device according to claim 1, wherein said sorption exchanger is connected to an air-conditioning unit of said vehicle, and the sorption exchanger is for cooling said air-conditioning unit.

15. A thermal energy management device according to claim 1, wherein said primary circuit further comprises a pump (55) to regulate the flow of said first heat-conducting fluid.

* * * * *